(12) United States Patent
Nakamura

(10) Patent No.: US 6,190,601 B1
(45) Date of Patent: Feb. 20, 2001

(54) METHOD FOR CONTROLLING A SCREW INJECTING APPARATUS AND THE SCREW INJECTING APPARATUS

(75) Inventor: Nobuyuki Nakamura, Sakaki-machi (JP)

(73) Assignee: Nissei Plastic Industrial Co., Nagano-ken (JP)

( * ) Notice: Under 35 U.S.C. 154(b), the term of this patent shall be extended for 0 days.

(21) Appl. No.: 09/204,807

(22) Filed: Dec. 3, 1998

(30) Foreign Application Priority Data

Dec. 5, 1997 (JP) .................................................. 9-336013

(51) Int. Cl.[7] .............................. B29C 45/23; B29C 45/50
(52) U.S. Cl. ....................... 264/443; 264/69; 264/328.17; 264/349; 366/78; 366/100; 425/174.2; 425/207; 425/564; 425/587
(58) Field of Search ..................... 264/69, 443, 328.17, 264/328.19, 349, 40.1, 40.5; 425/174.2, 207, 208, 587, 564, 568; 366/78, 100

(56) References Cited

U.S. PATENT DOCUMENTS

| | | | |
|---|---|---|---|
| 4,994,220 | * | 2/1991 | Gutjahr et al. .......................... 264/69 |
| 5,017,311 | * | 5/1991 | Furusawa et al. ................. 264/328.1 |
| 5,160,466 | * | 11/1992 | Allan et al. .............................. 264/69 |
| 5,202,066 | * | 4/1993 | Furusawa et al. ....................... 264/69 |
| 5,435,712 | * | 7/1995 | Probst ................................. 425/174.2 |
| 5,554,326 | * | 9/1996 | Nakazawa et al. ...................... 264/69 |
| 5,770,131 | * | 6/1998 | Bubel et al. ............................. 264/69 |
| 5,851,474 | * | 12/1998 | Allan et al. .............................. 264/69 |
| 5,885,495 | * | 3/1999 | Ibar ......................................... 264/69 |
| 5,951,928 | * | 9/1999 | Jinping ................................... 264/69 |

* cited by examiner

Primary Examiner—Jill L. Heitbrink
(74) Attorney, Agent, or Firm—Merchant & Gould P.C.

(57) ABSTRACT

A method for controlling a screw injecting apparatus having a heating cylinder and a screw slidably and rotatably received in the heating cylinder and designed to carry out a plasticizing-metering phase in which a predetermined amount of a molten material is accumulated forwardly of the screw by plasticizing and kneading a raw molding material via the screw and the heating cylinder, a waiting phase in which the screw is held inactive for a period between completion of the metering and subsequent injection of the molten material, and an injecting phase in which the molten material is injected. The method comprises the step of causing the apparatus to vibrate the molten material at a predetermined low frequency axially of the screw during the plasticizing-metering phase. By vibrating the molten material at a low frequency during the relatively long plasticizing-metering phase, the viscosity of the molten material can be reduced. Further, since vibrations are generated axially of the screw, sufficient vibrations can be applied to the tip of the molten material.

4 Claims, 10 Drawing Sheets

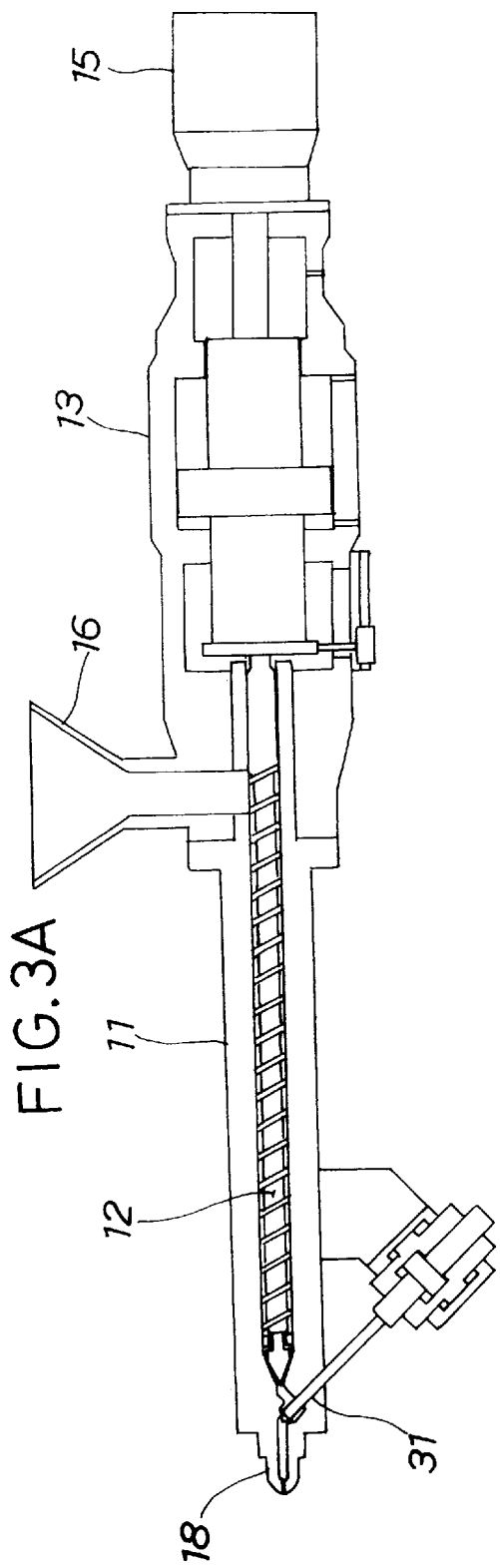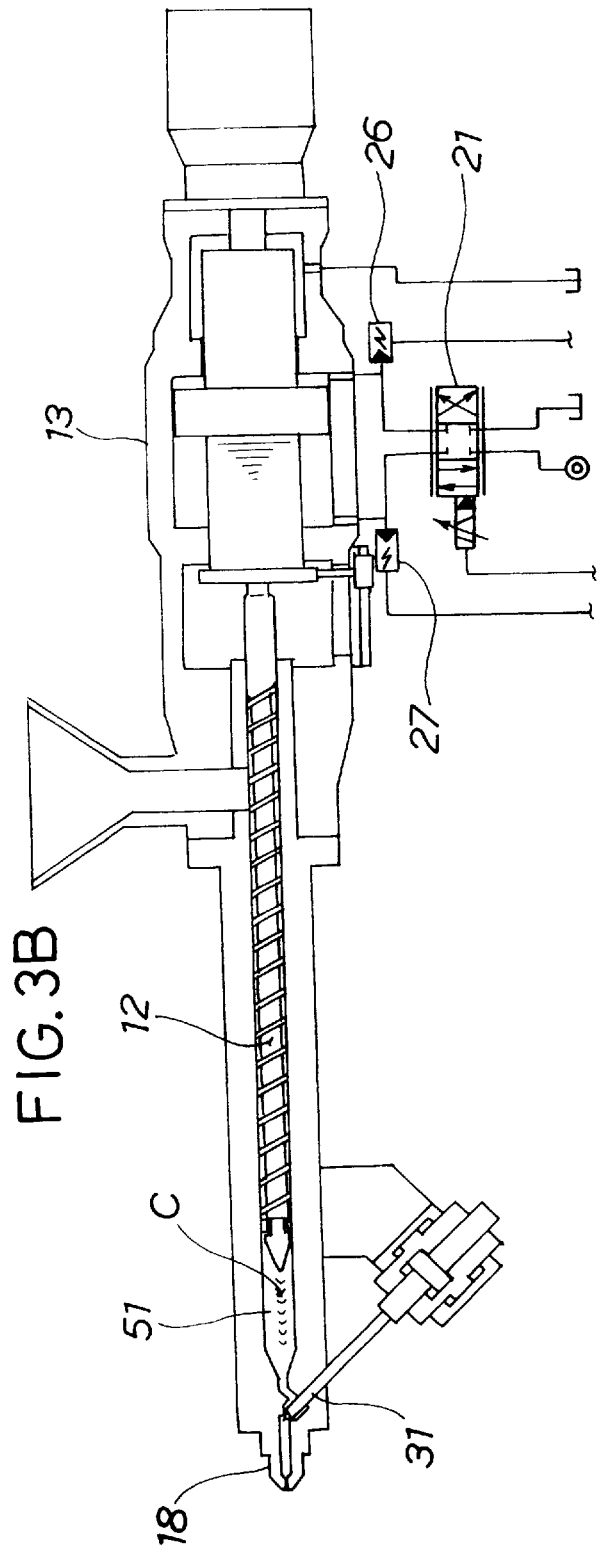

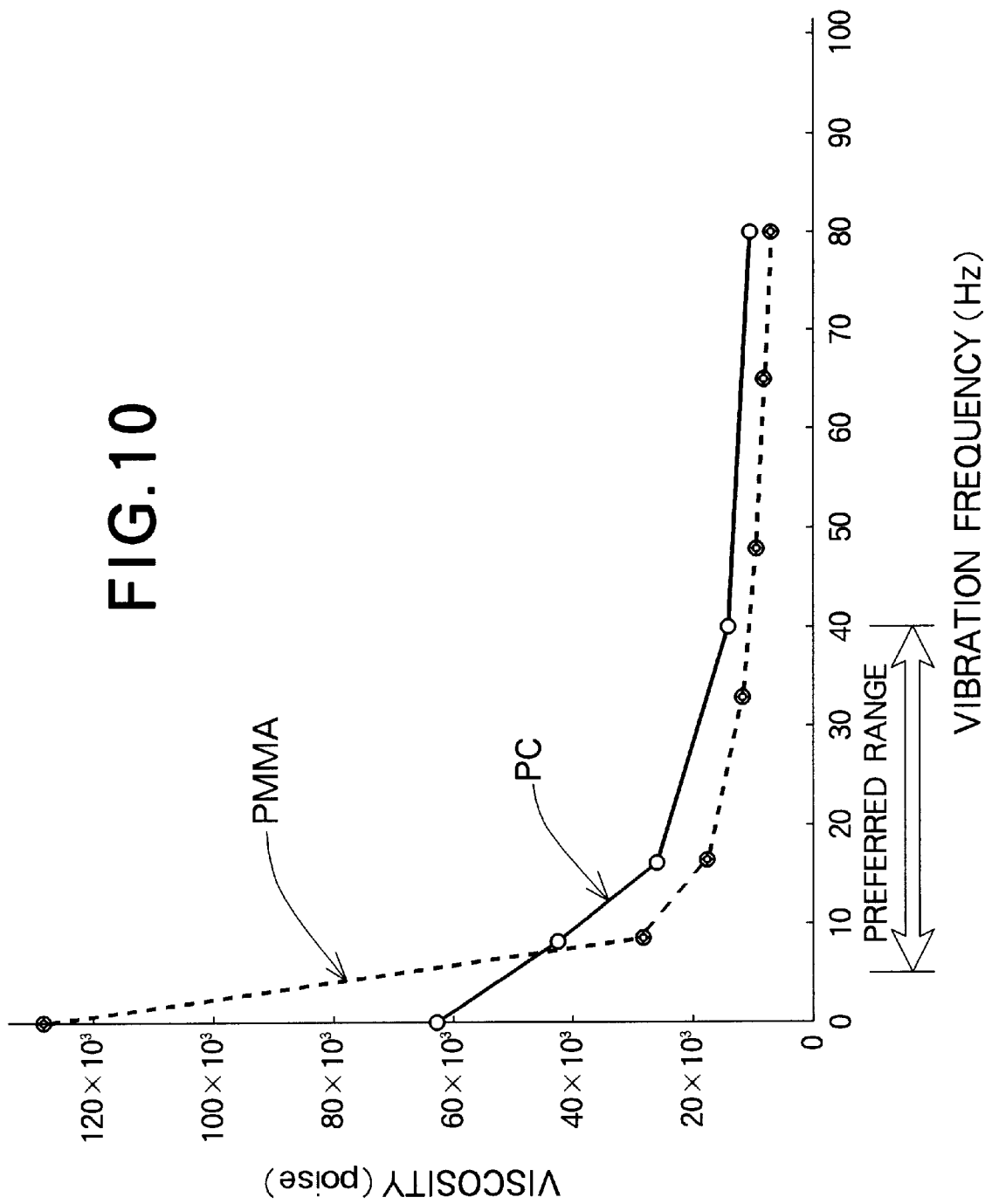

METHOD FOR CONTROLLING A SCREW INJECTING APPARATUS AND THE SCREW INJECTING APPARATUS

BACKGROUND OF THE INVENTION

1. Field of the Invention

The present invention relates to a method for controlling a screw injecting apparatus such that vibrations are given to a molding material to thereby decrease its viscosity, as well as to such a screw injecting apparatus.

2. Description of the Related Art

A typical prior screw injecting apparatus is shown in section in FIG. 9 hereof. The screw injecting apparatus 100 comprises a heating cylinder 101, a screw 102 received in the heating cylinder 101 rotatably and movably back and forth, an injecting cylinder 103 for moving the screw 102 back and forth, and a hydraulic motor 105 for rotating the screw 102 by means of a piston rod 104 of the injecting cylinder 103. In the injecting apparatus thus arranged, plasticizing-metering phase, waiting phase and injecting phase as described are carried out:

Plasticizing-Metering Phase: Raw molding materials are fed from a hopper 107 into the heating cylinder 101 during rotation of the screw 102 and heated by the heating cylinder 101 while being transferred toward a discharging nozzle 108 by rotation of the screw 102. By friction heat arising from the transfer and heat transmitted from the heating cylinder 101, the molding materials are plasticized and kneaded. The screw 102 is pushed back rightwardly by a counter force of a molten material accumulated around the tip of the nozzle 108. The amount of the molten material is measured by metering the retreating stroke of the screw 102.

Waiting Phase: After completion of the metering, the hydraulic motor 105 and the screw 102 are held inactive until the molten molding material becomes ripe for injection.

Injecting Phase: By the action of the injecting cylinder 103, the screw 102 is advanced at one stroke to cause the molten molding material accumulated forwardly of the screw 102 to be injected through the nozzle 108 into a mold not shown.

It is important to fill up cavities of the mold before solidification of the molten molding material therein progresses. Thus, the faster the injection speed becomes, the better. To speed up the injection, one may propose (1) to make the injection cylinder more pressurized, (2) to make the injection cylinder have an increased diameter, (3) to melt the molding material at an increased temperature, or (4) to decrease the viscosity of the molten molding material without relying on temperature increase.

The proposals (1) and (2) lead to up-sizing of the apparatus, thereby increasing the cost of production.

In the case of the proposal (3), the viscosity decreases by increase of the melting temperature. However, as can be seen from p-v-T (pressure-volume-temperature interrelation) characteristics, the density decreases as the temperature increases. Thus, volume variation becomes large when the temperatue is changed from a molding temperatue to a normal temperature. To compensate for the large volume variation, a large pressure becomes necessary. In a normal injection molding process, pressure control is effected through a gate, whereby the pressure distribution of the resin within the cavities of the mold becomes non-uniform. This non-uniformity becomes more significant when the pressure is increased. Thus, the proposal to increase the melting temperature of the molding material. Rather, the temperature of the molding material should be as low as possible so that the temperature difference between the molding material and the mold can be kept to a minimum.

Consequently, the proposal (4), that is, to decrease the viscosity of the molten molding material without relying on temperature increase, has been seriously noted by researchers. The present inventors have continuously researched to realize the proposal (4) by means of mechanical measures.

FIG. 10 hereof graphically shows the results of such inventors' research. As can be readily appreciated from the figure, the inventors have found during the research that the viscosity of the resin material significantly changes when the material is vibrated by a vibration frequency in a given range.

More specifically, vibration frequencies are shown in herz (Hz) along the horizontal axis while the material viscosity is shown in poise along the vertical axis. PMMA (poly(methyl methacrylate)), a typical resin material, was imparted various vibrations while maintaining it at 240° C. While it exhibits the viscosity of $126 \times 10^3$ poise at the frequency of 0 Hz, the PMMA exhibited the viscosity of $65 \times 10^3$ poise at 5 Hz, $14 \times 10^3$ at 30 Hz, and $9 \times 10^3$ poise at 55 Hz.

While it exhibits the viscosity of $63 \times 10^3$ at the frequency of 0 Hz, PC (polycarbonate) exhibited $26 \times 10^3$ poise at 15 Hz, and $15 \times 10^3$ poise at 40 Hz.

The research has thus revealed that it becomes possible to satisfactorily decrease the viscosity of the resin material by vibrating the material at the frequency ranging from 5 Hz to 40 Hz, desirably at 15 Hz or more.

A technique for applying vibrations to a molding material during injection thereof is known from, for example, Japanese Utility Model Laid-Open Publication No. SHO-63-197113 entitled "SHAPING INJECTION MOLDING APPARATUS WITH SHAKING CAPABILITY". The known apparatus includes an ultrasonic oscillator mounted in a heating cylinder thereof and an ultrasonic wave generator disposed remotely from the heating cylinder for ultrasonically vibrating the ultrasonic oscillator. In response to a high frequency signal, the ultrasonic wave generator generates a ultrasonic wave for vibrating the ultrasonic oscillator. The resulted ultrasonic vibrations are applied to a molten resin material being injected, thereby fully filling up finely-patterned portions and complex-shaped portions of a molded product.

Ultrasonic waves have a frequency above about 20 kHz which is too high for humans to hear. The ultrasonic wave generator is designed to produce such waves. This and the above-described arrangement bring about the following problems:

(a) it is likely that fine bubbles be formed in the molten material, because an extremely high vibration frequency is applied to the molten material, thereby suddenly changing the pressure of the molten material;

(b) there remains a fear that the effect of the vibrations or shaking may not reach deepest portions of the cavities of the mold, because the injecting phase is finished too quickly; and (c) being disposed within the heating cylinder, the ultrasonic oscillator will present a bar to the flow of the molten material.

SUMMARY OF THE INVENTION

It is therefore an object of the present invention to provide a method for controlling a screw injecting apparatus, which does not give rise to the problems (a)–(c).

Another object of the present invention is to provide a screw injecting apparatus in which the inventive method can be performed.

According to one aspect of the present invention, there is provided a method for controlling a screw injecting apparatus having a heating cylinder and a screw slidably and rotatably received in the heating cylinder and designed to carry out a plasticizing-metering phase in which a predetermined amount of a molten material is accumulated forwardly of a tip of the screw by plasticizing and kneading a raw molding material via the screw and the heating cylinder, a waiting phase in which the screw is held inactive for a period between completion of the metering and subsequent injection of the molten material, and an injecting phase in which the molten material is injected, which method comprises the step of causing the apparatus to vibrate the molten material at a predetermined low frequency axially of the screw during the plasticizing-metering phase.

By vibrating the molten material at a low frequency during the relatively long plasticizing-metering phase, the viscosity of the molten material can be reduced. Further, since vibrations are generated axially of the screw, sufficient vibrations can be applied to the tip of the molten material.

According to a second aspect of the present invention, there is provided a method for controlling a screw injecting apparatus having a heating cylinder and a screw slidably and rotatably received in the heating cylinder and designed to carry out a plasticizing-metering phase in which a predetermined amount of a molten material is accumulated forwardly of the screw by plasticizing and kneading a raw molding material via the screw and the heating cylinder, a waiting phase in which the screw is held inactive for a period between completion of the metering and subsequent injection of the molten material, and an injecting phase in which the molten material is injected, which method comprises the step of causing the apparatus to vibrate the molten material at a predetermined low frequency axially of the screw during the waiting phase.

By vibrating the molten material at a low frequency during the waiting phase, the viscosity of the molten material can be reduced. Further, since vibrations are generated axially of the screw, sufficient vibrations can be applied to the tip of the molten material.

The vibration may desirably be produced by means of an injection cylinder mechanically connected to the screw.

By minutely moving the piston rod of the injection cylinder back and forth, the screw can be vibrated at a predetermined frequency. Use of the injection cylinder for vibration generation avoids the possible cost increase.

According to a third aspect of the present invention, there is provided a method for controlling a screw injecting apparatus having a heating cylinder and a screw slidably and rotatably received in the heating cylinder and designed to carry out a plasticizing-metering phase in which a predetermined amount of a molten material is accummulated forwardly of the screw by plasticizing and kneading a raw molding material via the screw and the heating cylinder, a waiting phase in which the screw is held inactive for a period between completion of the metering and subsequent injection of the molten material, and an injecting phase in which the molten material is injected, which method comprises the step of causing the apparatus to vibrate the molten material at a predetermined low frequency in a direction of flow of the material during the injecting phase.

By vibrating the molten material during the injecting phase, the molten material is rendered to have reduced viscosity until the injection is completed.

The vibration in the injecting phase may desirably be produced by means of a needle valve mechanism provided for closing an injecting nozzle of the apparatus.

Desirably, the predetermined frequency falls in a range of 5 to 40 Hz. A frequency lower than 5 Hz can not reduce the viscosity of the molding material sufficiently. A frequency higher than 40 Hz makes no much difference in viscosity reduction rate. Therefore, a vibration frequency should be chosen from a range between 5 to 40 Hz depending on resins used.

According to a fourth aspect of the present invention, there is provided a screw injecting apparatus, which comprises a heating cylinder for heating a molding material being transferred therethrough, a nozzle disposed at a tip of the heating cylinder for serving as an injection port, a needle valve mechanism having a needle for closing the nozzle, a screw received in the heating cylinder for transferring the molding material toward the nozzle while being rotated, the screw being moved, when the nozzle is closed by the needle, in a direction away from the nozzle by the molding material heat-molten in the heating cylinder and accumulated forwardly of a tip of the screw, a hydraulic motor for rotating the screw, a cylinder actuator connected to a proximal end of the screw for axially vibrating the screw back and forth, and a hydraulic pressure controller for driving the cylinder actuator to minutely vibrate the screw back and forth so as to apply vibrations to the molten molding material located around the screw tip when the screw is moved in the direction away from the nozzle and to make the screw advance toward the nozzle for injecting the molten molding material from the nozzle when the needle is opening the nozzle.

Preferably, the needle valve mechanism further comprises a primary cylinder having a primary piston slidable therein, a secondary cylinder formed integrally with the primary cylinder and having a secondary piston slidable therein, and a piston rod extending axially from the secondary piston, the needle for closing/opening the nozzle being connected to a distal end of the piston rod. The hydraulic pressure controller drives the primary cylinder so that the primary piston advances along with the secondary piston of the secondary cylinder to move the needle toward the nozzle to thereby close the latter, and, as the needle is opening the nozzle, drives the secondary cylinder separately from the primary cylinder so that the secondary piston moves back and forth to move the needle back and forth to thereby apply vibrations to the molten molding material passing through the nozzle.

BRIEF DESCRIPTION OF THE DRAWINGS

Certain preferred embodiments of the present invention will hereinafter be described in detail, by way of example only, with reference to the accompanying drawings, in which:

FIGS. 3A and 3B illustrate the plasticizing-metering phase and waiting phase carried out in the screw injecting apparatus;

FIG. 10 is a graph showing relations between vibration frequencies and resin material viscosity.

DETAILED DESCRIPTION OF THE PREFERRED EMBODIMENT

The following description is merely exemplary in nature and is in no way intended to limit the invention or its application or uses.

Figure 1:
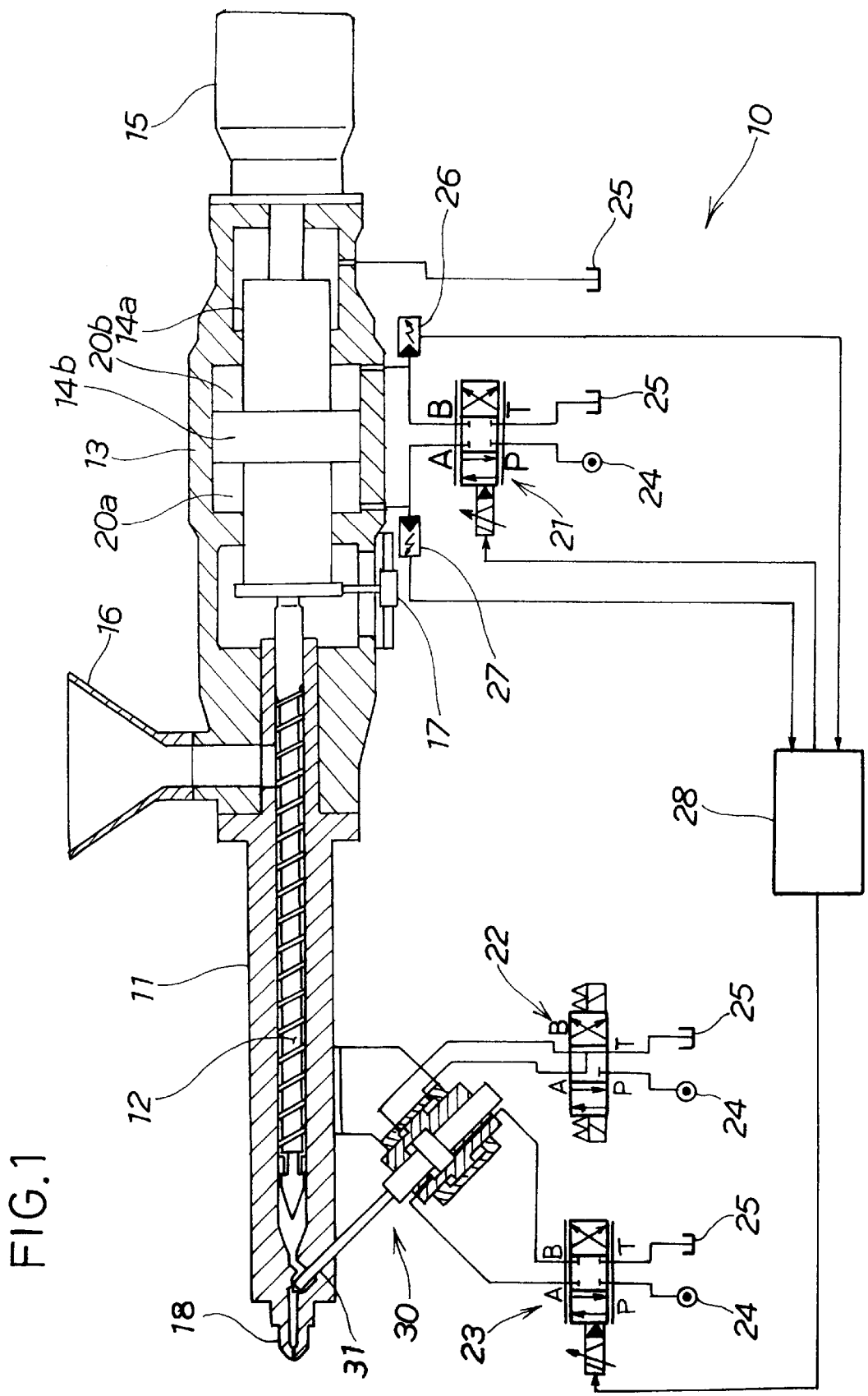
FIG. 1 is a cross-sectional view illustrating a screw injecting apparatus according to the present invention.

Referring initially to FIG. 1, a screw injecting apparatus 10 according to the present invention comprises a heating cylinder 11, a screw 12 accommodated in the heating cylinder 11 rotatably and movably back and forth (slidably in a right-and-left direction in the figure), an injection cylinder 13 connected to a proximal end of the screw 12 for moving the screw 12 back and forth, a hydraulic motor 15 for rotating the screw 12 via a piston rod 14a of the injection cylinder 13, a hopper 16 as an entry port for raw molding materials, a metering scale 17 for metering the amount of a molten molding material, a needle valve mechanism 30 to be discussed in detail later, and a hydraulic pressure circuit and a control section 28 explained below. Within the injection cylinder 13, there are defined a front oil chamber 20a and a rear oil chamber 20b. In place of the hydraulic motor 15, an electric motor may also be used.

First servo valve 21 is of the four-port, oil-pressure-selectable type and hence has ports A and B connected to the injection cylinder 13, a port P connected to a source of hydraulic pressure 24, and a port T connected to an oil tank 25. The first servo valve 21 can be switched by the control section 28 such that a high pressure oil is supplied from the hydraulic pressure source 24 to the front and rear oil chambers 20a, 20b and discharged from the latter to the oil tank 25. By minutely regulating the amount of oil supply to and discharge from the chambers 20a, 20b through the first servo valve 21, the hydraulic pressure within the front and rear oil chambers 20a, 20b can be regulated as desired.

Selector valve 22 has ports A and B connected to a primary cylinder (discussed later) of the needle valve mechanism 30. The valve 22 moves the needle valve mechanism 30 largely by supplying oil from the hydraulic pressure source 24 to the primary cylinder and discharging the oil from the primary cylinder to the oil tank 25.

Second servo valve 23 has ports A and B connected to a secondary cylinder (discussed later) of the needle valve mechanism 30 and moves (vibrates) a needle 31 of the valve mechanism 30 back and forth minutely by supplying oil from the hydraulic pressure source 24 to the secondary cylinder and discharging the oil therefrom to the oil tank 25.

Reference numerals 26 and 27 designate pressure sensors for detecting the internal pressure of the front and rear oil chambers 20a, 20b. On the basis of outputs from the pressure sensors 26, 27, the control section 28 controls the oil pressure selection of the first and second servo valves 21, 23 and the selector valve 22.

Figure 2:
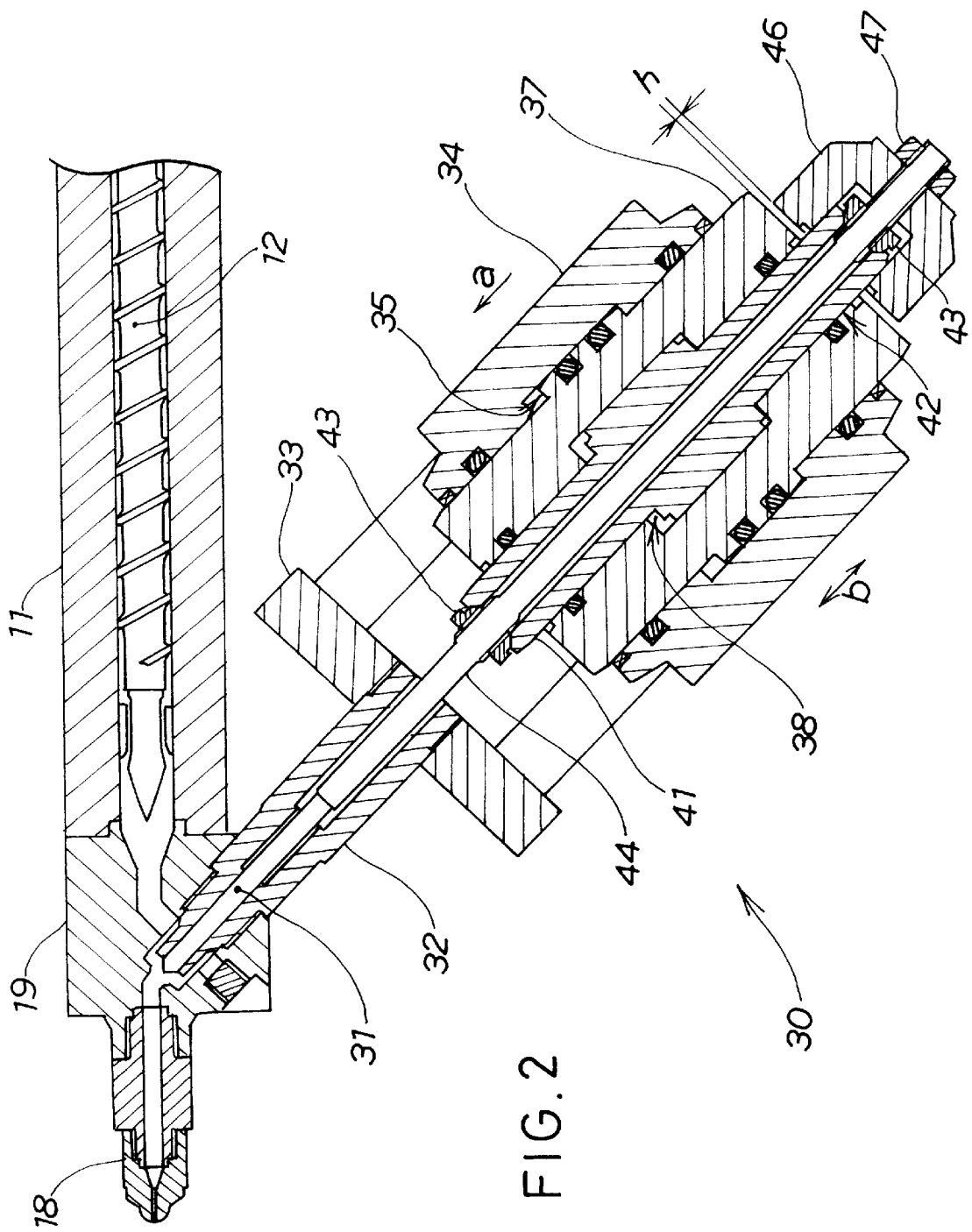
FIG. 2 is an enlarged sectional view illustrating a needle valve mechanism of the screw injecting apparatus.

Turning now to FIG. 2, the needle valve mechanism 30 comprises a guide 32 engaged in a block 19 connecting the heating cylinder 11 and the nozzle 18, the primary cylinder 34 connected to the guide 32 via a bracket 33, a primary piston 35 slidably disposed internally of the primary cylinder 34, the secondary cylinder 37 formed integrally with the primary piston 35, a secondary piston 38 slidably disposed internally of the secondary piston 37, front and rear piston rods 41, 42 extending from the secondary piston 38 in a forward-and-rearward direction, an elongated rod 44 received in the piston rods 41, 42 and fixed to the latter via bushes 43, 43, the needle 31 disposed at a distal end of the elongated rod 44 and capable of making advancing and retreating movements, and an amplitude adjusting nut 46 mounted to a proximal end of the elongated rod 44.

In FIG. 2, the needle 31 is placed in an open position in which the nozzle 18 of the heating cylinder 11 is opened. When the primary piston 35 is advanced or moved in the direction of arrow a relative to the primary cylinder 34 via a hydraulic pressure generated by switching the selector valve 22, the needle 31 moves to a close position in which the nozzle 18 is closed. During a plasticizing-metering phase, the nozzle 18 is closed by the needle 31. By thus moving the primary piston 35 back and forth relative to the primary cylinder 34, the nozzle 18 can be opened and closed by the needle 31.

Upon injection of a molten material, the needle 31 is positioned to open the nozzle 18, as shown in FIG. 2, while the secondary piston 38 is moved reciprocally (back and forth) in the direction of arrow b relative to the secondary cylinder 37. In this instance, the needle 31 never closes a flow path of the molten material in its advance limit. In its half-open position, the needle 31 thus vibrates the molten material, thereby decreasing the viscosity of the material.

The vibration range of the needle 31 is determined by an amplitude h which can be varied by turning an amplitude adjusting nut 46 rightwardly or leftwardly. As a front end surface of the amplitude adjusting nut 46 hits a rear end surface of the secondary cylinder 37, the needle 31 can not advance any further. This is the advance limit of the needle 31. Reference numeral 47 designates a nut for preventing loosening of the amplitude adjusting nut 46.

Discussion will now be made as to the operation of the described screw injecting apparatus with reference to FIGS. 3A and 3B.

FIG. 3A shows an initial stage of the plasticizing-metering phase. By turning the screw 12 via the hydraulic motor 15, a molding material is transferred from the hopper 16 to around a tip of the screw 12. During this transfer, the molding material is turned into a molten state. Then, the screw 12 is vibrated axially via the injection cylinder 13 at a given low frequency (e.g, 5 to 40 Hz).

FIG. 3B shows the last stage of the plasticizing-metering phase and a waiting phase. By minutely vibrating a piston 14b of the injection cylinder 13 via the first servo valve 21, the tip of the screw 12 vibrates in synchronism. As a result, the molten material 51 vibrates as shown by reference character c. More details will be given later in relation to FIGS. 4A to 4C.

Figure 4A:
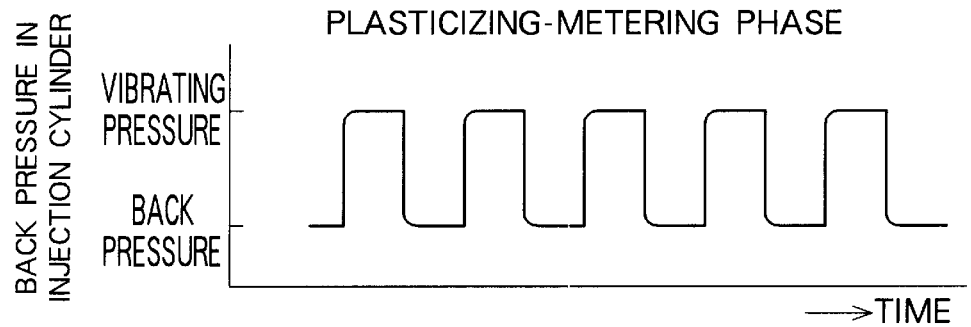
FIGS. 4A to 4C are timecharts of the plasticizing-metering phase.
Figure 4B:
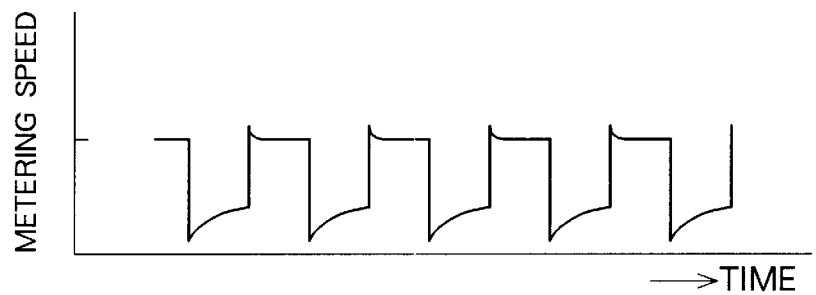
Figure 4C:
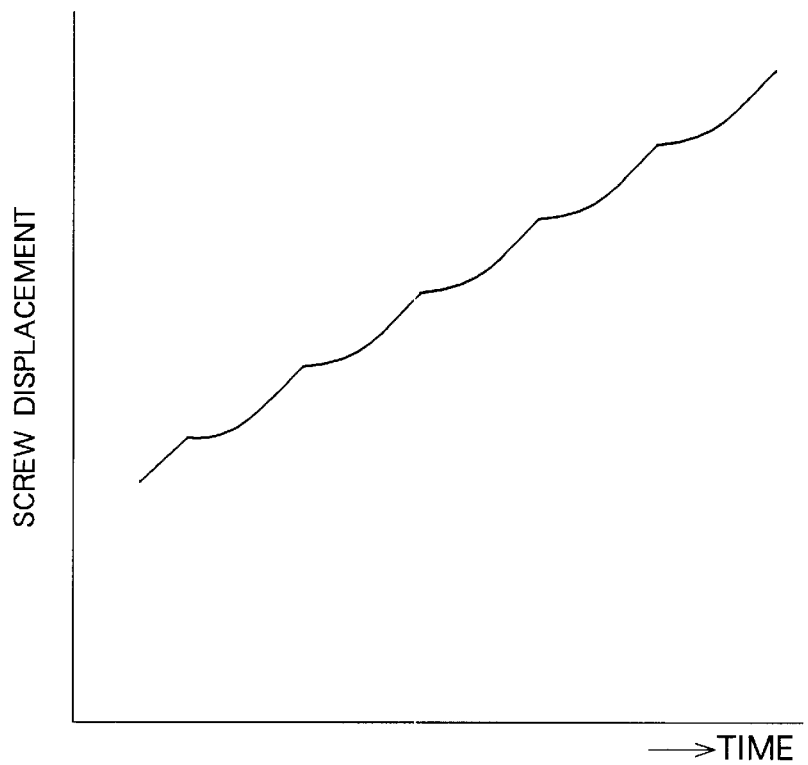

Reference is next made to the timecharts of FIGS. 4A to 4C. In the plasticizing-metering phase, with the needle 31 closing the nozzle 18, the molten material is carried forward by the screw 12 and accumulated in front thereof. The pressure of the accumulated molten material pushes back the screw 12. At this time, the piston 14b in the injection cylinder is also pushed back, causing a hydraulic pressure producing oil in the rear oil chamber 20b to be discharged to the oil tank 25. The pressure of that oil is regulated to thereby control the back pressure arising therein. For example, when the screw 12 and the piston 14b are being pushed back, a small amount of pressurizing oil is supplied to the rear oil chamber 20b and at the same time a small amount of oil is discharged from the front oil chamber 20a. This causes the screw 12 and the piston 14b to slightly advance (in a leftward direction in the figure). Immediately thereafter, the first servo valve 21 is switched over to supply a small amount of oil to the front oil chamber 20a and to discharge a small amount of oil from the rear oil chamber 20b, thereby causing the screw 12 and the piston 14 to retreat or move backward (in a rightward direction in the figure) again. By repeating such a hydraulic pressure switch-over operation, the screw 12 moves back and forth (vibrates minutely).

FIG. 4A shows the back pressure in the injection cylinder. The pressure of the rear oil chamber 20b is increased by a vibration pressure resulted from adding a predetermined pressure to the back pressure, thereby causing the screw 12 and the piston 14b to advance. Then, the predetermined pressure is subtracted from the vibration pressure to cause the screw 12 and the piston 14b to retreat. The back pressure and the vibration pressure occur alternately. In the illustrated example, the vibration pressure occurs at the frequency of ½ per cycle.

As a result of the foregoing back pressure control (regulation of the pressure of the rear oil chamber), the metering speed changes as shown in FIG. 4B.

FIG. 4C shows a mode of displacement of the screw. The screw retreats with time. However, since the speed of retreat of the screw is not constant, as can be appreciated from FIG. 4B, the screw displacement becomes wavy. This means that the screw moves back and forth as it retreats. By such back and forth movement of the screw, the molten material can be vibrated.

Figure 5A:
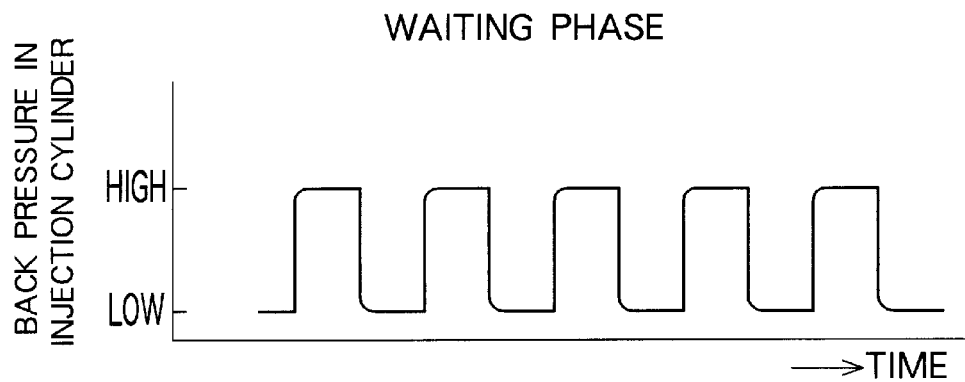
FIGS. 5A and 5B are timecharts of the waiting phase.
Figure 5B:
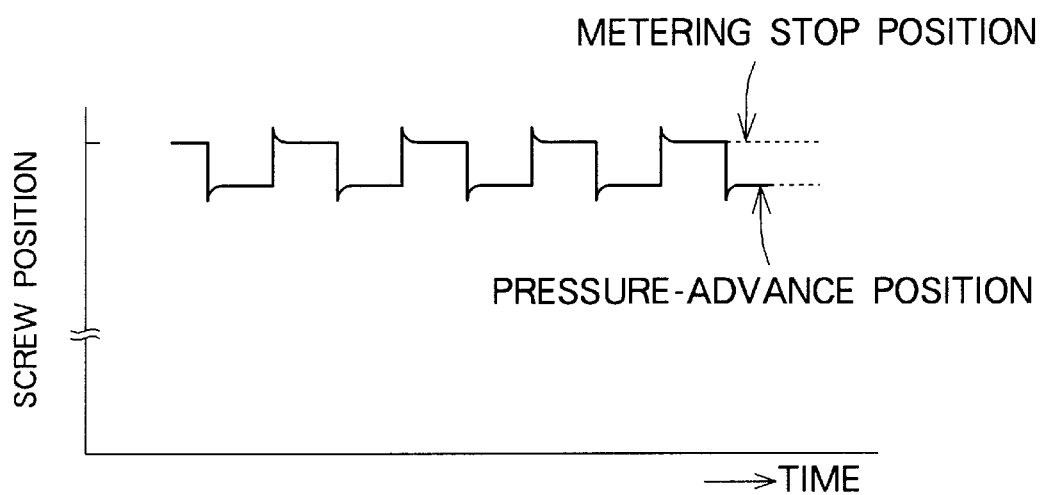

Reference is made next to FIGS. 5A and 5B showing the timecharts of the waiting phase. In normal molding, no particular control is performed in the waiting phase. But in the waiting phase of the present invention, pressure control, like that done in the injecting phase (for high pressure injecting advance and low pressure injecting advance), is carried out in the waiting phase by supplying a pressurizing oil from the hydraulic pressure source to the injection cylinder.

FIG. 5A shows the back pressure arising in the injection cylinder. By pressure control, high pressure and low pressure occur alternately as shown in the figure. In the illustrated example, the occurrence of the high pressure and the low pressure is 1:1 per cycle.

FIG. 5B shows the corresponding positions of the screw. The screw moves back and forth between a metering stopped position and a pressure-advanced position, whereby the molten resin material is vibrated.

Figure 6:
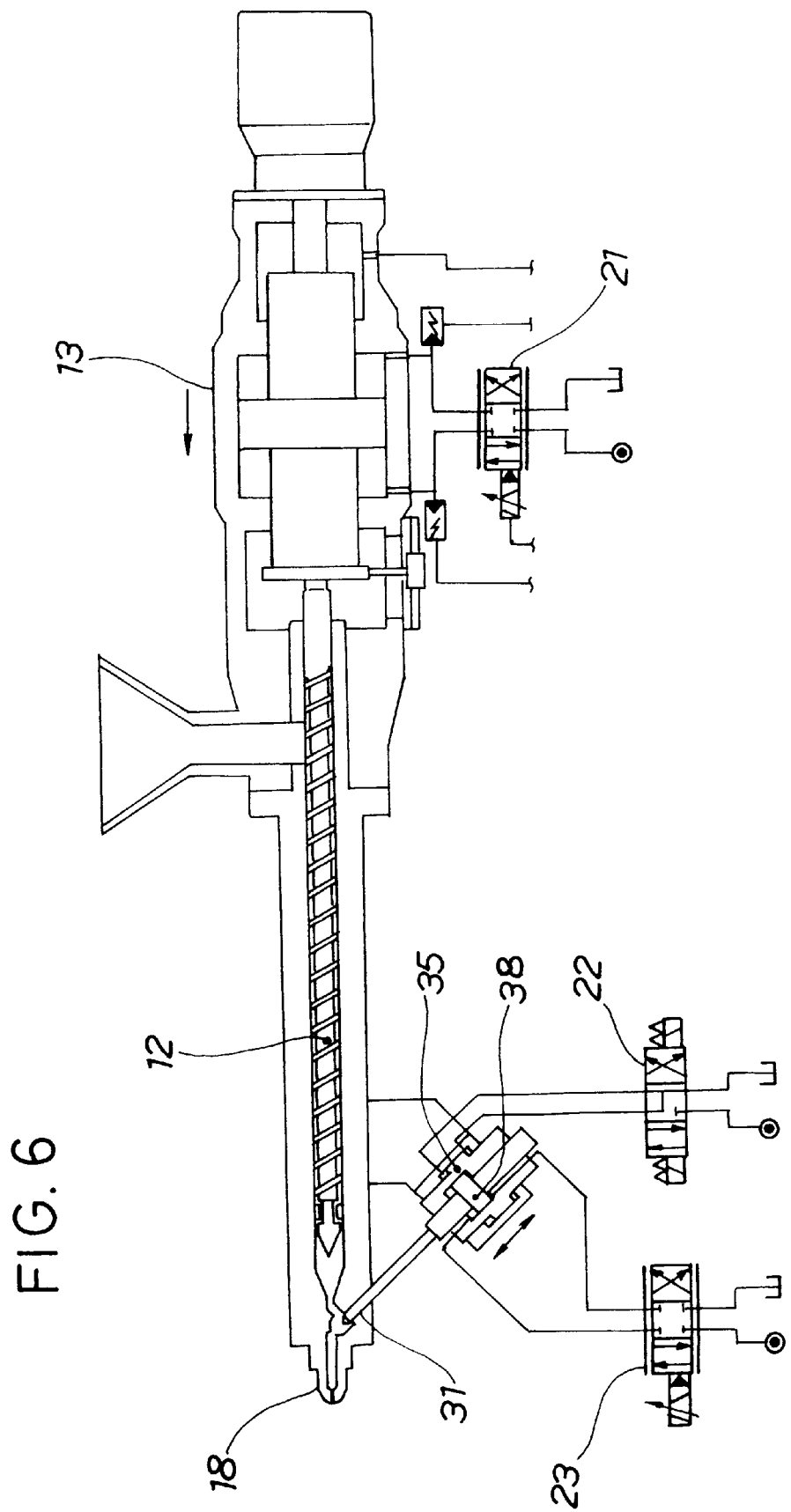
FIG. 6 illustrates the injecting phase of the screw injecting apparatus.

Referring to FIG. 6, discussion will be made next as to the injecting phase of the screw injecting apparatus according to the present invention. Firstly, the primary piston 35 is made to retreat. At the same time, the back and forth movement of the secondary piston 38 is initiated to minutely vibrate the needle 31. This vibration continues until termination of the injection. Next, the screw 12 is moved forward quickly (at a stroke) through the injection cylinder to cause the molten material to be injected from the nozzle 18.

Figure 7A:
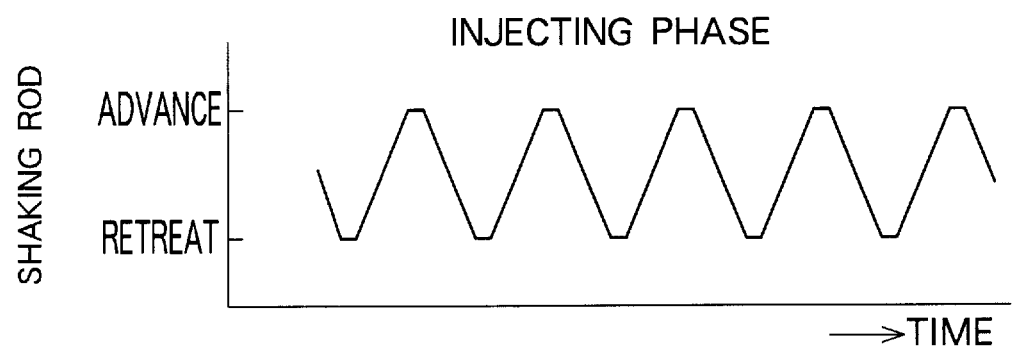
FIGS. 7A to 7C are timecharts of the injecting phase.
Figure 7B:
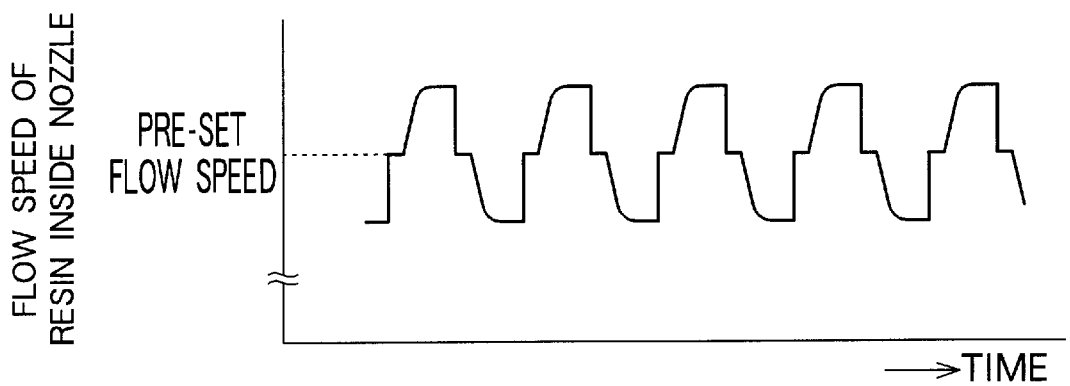
Figure 7C:
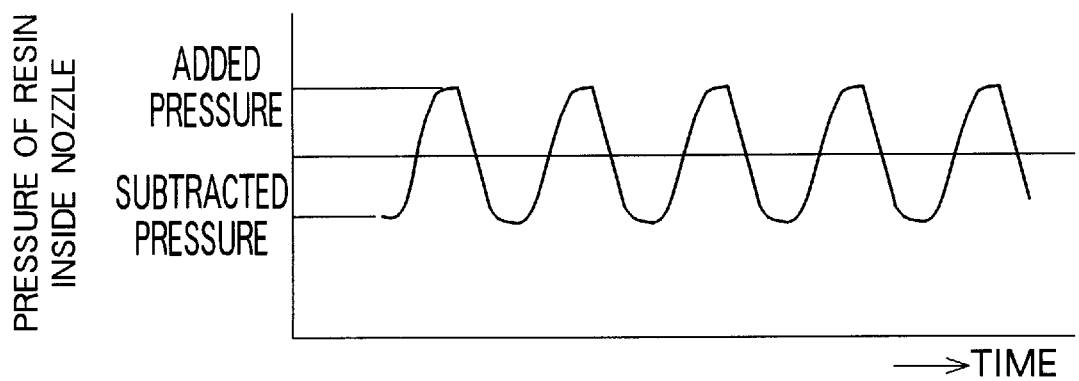

Shown in FIGS. 7A to 7C are timecharts of the injecting phase of the inventive screw injecting apparatus. For moving the screw back and forth during the injection phase, difficulty is experienced in controlling the position, speed and pressure of the screw. Thus, in the present invention, vibrations are given by means of a shaking rod, keeping the filling speed control and filling pressure control as they are done in normal molding.

As shown in FIG. 7A, the shaking rod (needle 31) is moved back and forth. By moving the shaking rod back and forth, the volume of the resin passage within the nozzle 18 varies and the speed of flow of the molten resin through the nozzle varies as shown in FIG. 7B. By the back and forth movement of the shaking rod, the resin pressure within the nozzle varies as shown in FIG. 7C. The added pressure corresponds to a resin pressure inside the nozzle as the shaking rod advanced while the subtracted pressure corresponds to a resin pressure inside the nozzle as the shaking rod retreated. By thus moving the shaking rod back and forth, the volume and the pressure inside the nozzle are varied to thereby apply minute vibrations to the molten resin inside the nozzle.

Figure 8:
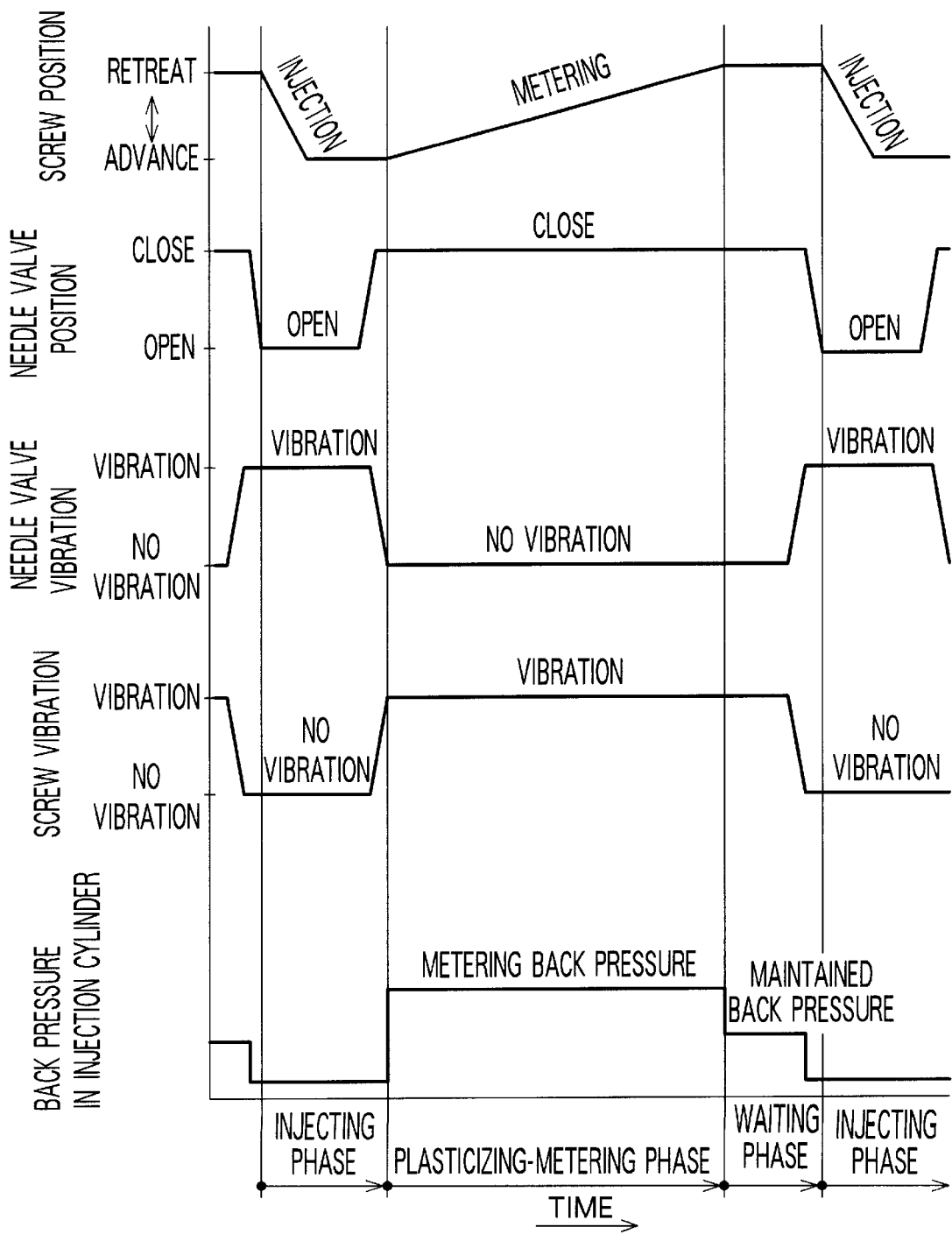
FIG. 8 is a general timechart illustrating the relevant phases of the screw injecting apparatus.
Figure 9:
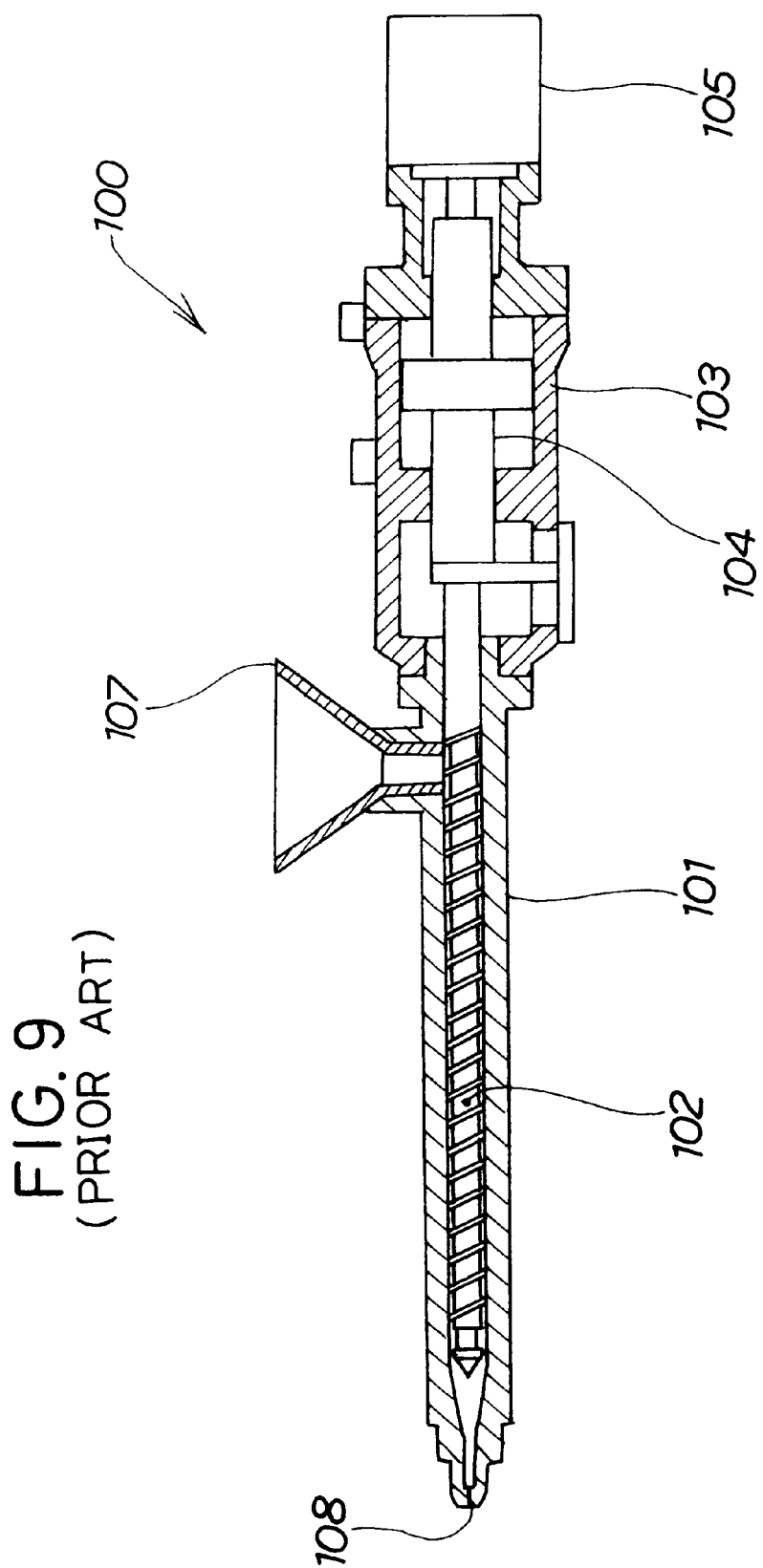
FIG. 9 is a cross-sectional view illustrating a typical conventional screw injecting apparatus.

Reference is now made to FIG. 8 illustrating a general timechart of the various phases involved in the screw injecting apparatus according to the present invention. Time is given along the horizontal axis. Given along the vertical axis are a screw position, a needle valve position, needle valve vibration, screw vibration and back pressure within the injection cylinder.

As can be seen from the general timechart, vibrations are applied to the molten resin during the plasticizing-metering phase and the waiting phase by vibrating the screw. During the injecting phase, vibrations are applied to the molten resin by vibrating the needle valve.

In the plasticizing-metering phase, the screw is caused to gradually retreat by rotating it, whereupon the needle valve is placed in a non-vibrating close postion with the screw vibrated in its stead. The resin being metered is supplied with the back pressure via the injection cylinder.

In the waiting phase, the screw is again vibrated while it is stopped rotating, whereupon the needle valve is placed in the non-vibrating close position. The molten resin positioned forwardly of the tip of the nozzle is supplied with the maintaining back pressure via the injection cylinder.

In the injecting phase, the screw is quickly advanced, whereupon the needle valve is opened and vibrated to apply continuous vibrations to the molten resin. Vibration of the screw is stopped, and the maintaining back pressure in the injection cylinder is cancelled.

More accurately, the back pressure in the injection cylinder should be graphed to show partially waved but this has been omitted for the sake of simplicity.

A technique for axially vibrating the screw at a predetermined frequency may be selected arbitrarily. For example, the conventional servo valve as employed in the present embodiment may also be used to produce the required vibrations. Alternatively, the back pressure in the injection cylinder may be controlled by means of a booster connected with a back pressure chamber of the injection cylinder. A small pistion for exclusively for screw vibration may be mechanically connected to a shaft of the screw.

It will also be readily appreciated by those skilled in the art that a technique for vibrating the molten material in a flow direction thereof may also be selected arbitrarily.

In place of the primary and secondary cylinders, the described needle valve mechanism may have only the primary cylinder capable of valve opening/closing and shaking operations.

Obviously, various minor changes and modifications of the present invention are possible in the light of the above teaching. It is therefore to be understood that within the scope of the appended claims, the present invention may be practiced otherwise than as specifically described.

What is claimed is:

1. A method for controlling a screw injecting apparatus having a heating cylinder and a screw slidably and rotatably received in the heating cylinder and designed to carry out a plasticizing-metering phase in which a predetermined amount of a molten material is accumulated forwardly of the screw by plasticizing and kneading a raw molding material via the screw and the heating cylinder, a waiting phase in which the screw is held inactive for a period between completion of the metering and subsequent injection of the molten material, and an injecting phase in which the molten material is injected, said method comprising:

(a) causing said apparatus to vibrate the molten material at a predetermined low frequency axially of the screw during the plasticizing-metering phase;

(b) causing said apparatus to vibrate the molten material at a predetermined low frequency axially of the screw during the waiting phase;

wherein said vibrations in the plasticizing-metering phase or said vibrations in the waiting phase are produced by an injection cylinder mechanically connected to said screw; and (c) causing said apparatus to vibrate the molten material at a predetermined low frequency in a direction of flow of the material during the injecting phase, wherein said vibrations in the injecting phase are produced by a needle valve mechanism provided for closing an injecting nozzle of said apparatus.

2. A method for controlling a screw injecting apparatus, according to claim 1, wherein each said predetermined low frequency falls in a range of 5 to 40 Hz.

3. A screw injecting apparatus comprising:

a heating cylinder for heating a molding material being transferred therethrough;

a nozzle disposed at a tip of said heating cylinder for serving as an injection port;

a needle valve mechanism having a needle for closing said nozzle;

a screw received in said heating cylinder for transferring the molding material toward said nozzle while rotating, said screw being moved, when said nozzle is closed by said needle, in a direction away from said nozzle by the molding material heat-molten in said heating cylinder and accumulated forwardly of a tip of said screw;

a hydraulic motor for rotating said screw;

a cylinder actuator connected to a proximal end of said screw for axially vibrating said screw back and forth; and a hydraulic pressure controller for driving said cylinder actuator to minutely vibrate said screw back and forth so as to apply vibrations to the molten molding material located around said screw tip when said screw is moved away from said nozzle and to make said screw advance toward said nozzle for injecting the molten molding material from said nozzle when said needle opens said nozzle.

4. A screw injecting apparatus according to claim 3, wherein said needle valve mechanism further comprises a primary cylinder having a primary piston slidable therein, a secondary cylinder formed integrally with said primary cylinder and having a secondary piston slidable therein, and a piston rod extending axially from said secondary piston, said needle for closing/opening said nozzle being connected to a distal end of said piston rod, and wherein said hydraulic pressure controller drives said primary cylinder so that said primary piston advances along with said secondary piston of said secondary cylinder to move said needle toward said nozzle to thereby close said nozzle, and, as said needle is opening said nozzle, drives said secondary cylinder separately from said primary cylinder so that said secondary piston moves back and forth to move said needle back and forth to thereby apply vibrations to the molten molding material passing through said nozzle.

* * * * *